(12) United States Patent
Sweeney et al.

(10) Patent No.: US 10,290,074 B2
(45) Date of Patent: *May 14, 2019

(54) COORDINATING ON-DEMAND TRANSPORTATION WITH AUTONOMOUS VEHICLES

(71) Applicant: Uber Technologies, Inc., San Francisco, CA (US)

(72) Inventors: Matthew Sweeney, Pittsburgh, PA (US); Anthony Levandowski, Pittsburgh, PA (US)

(73) Assignee: Uber Technologies, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/605,060

(22) Filed: May 25, 2017

(65) Prior Publication Data
US 2018/0342035 A1  Nov. 29, 2018

(51) Int. Cl.
*G05D 1/00* (2006.01)
*G06Q 50/30* (2012.01)

(52) U.S. Cl.
CPC ........... *G06Q 50/30* (2013.01); *G05D 1/0088* (2013.01)

(58) Field of Classification Search
CPC ............................. G06Q 50/30; G05D 1/0088
USPC .......................................................... 701/23
See application file for complete search history.

(56) References Cited

U.S. PATENT DOCUMENTS

| | | | |
|---|---|---|---|
| 2007/0150375 A1* | 6/2007 | Yang | G06Q 10/08 705/339 |
| 2009/0106124 A1* | 4/2009 | Yang | G06Q 10/08 705/26.1 |
| 2014/0172727 A1* | 6/2014 | Abhyanker | G06Q 50/30 705/307 |
| 2015/0227890 A1* | 8/2015 | Bednarek | G06Q 10/08355 705/26.81 |
| 2015/0339928 A1* | 11/2015 | Ramanujam | G08G 1/202 701/23 |
| 2015/0346727 A1* | 12/2015 | Ramanujam | B62D 15/0285 701/23 |
| 2016/0364823 A1* | 12/2016 | Cao | G06Q 50/30 |
| 2017/0213308 A1* | 7/2017 | Wellborn | B60R 25/24 |
| 2018/0211186 A1* | 7/2018 | Rakah | G08G 1/096844 |
| 2018/0238694 A1* | 8/2018 | Bellotti | G01C 21/3438 |

* cited by examiner

*Primary Examiner* — Atul Trivedi
(74) *Attorney, Agent, or Firm* — Dority & Manning, P.A.

(57) ABSTRACT

An on-demand transport facilitation system can receive transport requests from requesting users throughout a given region, and select autonomous vehicles (AVs) and human driver to service the transport requests. The AV can operating on a mapped and labeled autonomy grid within the given region. For a given transport request, the transport system can determine an optimal pick-up location along the autonomy grid based on the current location of the requesting user and a current location of a selected AV, and transmit data indicating walking directions from the current location of the requesting user to the optimal pick-up location. The transport system may then coordinate the rendezvous by monitoring progress made by the requesting user and AV to the optimal pick-up location, and controlling the pace of the AV.

20 Claims, 8 Drawing Sheets

COORDINATING ON-DEMAND TRANSPORTATION WITH AUTONOMOUS VEHICLES

BACKGROUND

Autonomous vehicle (AV) operation on public roads and typically involves laborious mapping and labeling of ground truth data using sensor instruments, such as LIDAR and stereoscopic cameras. AVs utilize these maps with live sensor data to identify and classify any objects of interest (e.g., pedestrians, other vehicles, traffic signals, road signs, etc.) and to perform localization—determining precise location and orientation at any given instance.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
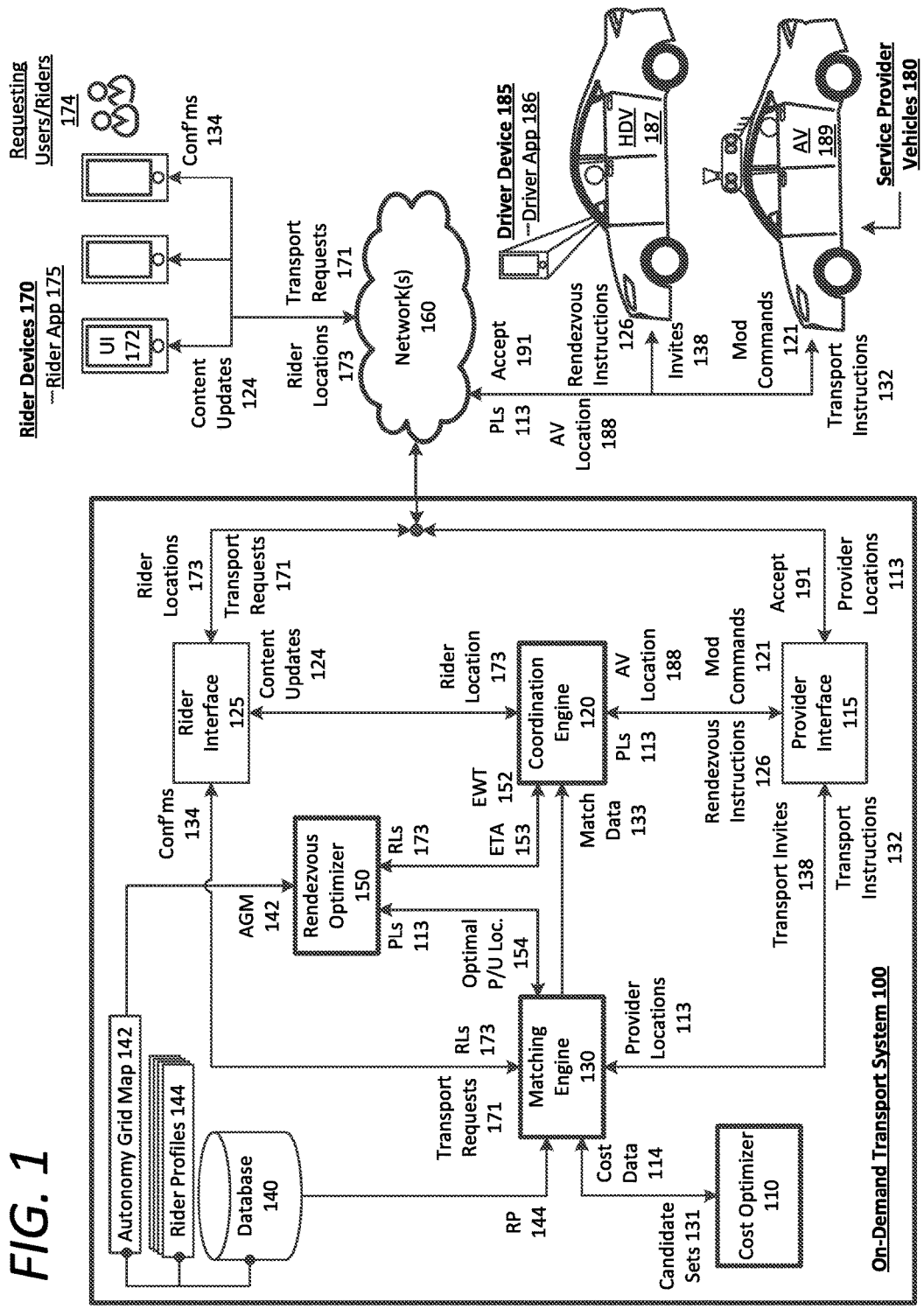
FIG. 1 is a block diagram illustrating an example on-demand transport facilitation system, according to examples described herein.

An on-demand transport facilitation system is described herein that manages on-demand transportation services linking available drivers and/or autonomous vehicles (AVs) with requesting riders throughout a given region (e.g., a metroplex such as the greater Pittsburgh, Pa. metropolitan area). In doing so, the transport facilitation system (or "transport system") can receive requests for transportation from requesting users via a designated rider application executing on the users' computing devices. The transport system can receive a transport request and identify a number of proximate available vehicles relative to the user. The transport system may then select an available driver or AV to service the transport request based on a determined or inputted pick-up location by the requesting user. As provided herein, the transport request can comprise an on-demand carpooling request, a standard ride-share request, a high-capacity vehicle request, a luxury vehicle request, a professional driver request, a request for AV transportation, or any combination of the foregoing.

The on-demand transport system can select an autonomous vehicle (AV) to service a transport request received from a requesting user. In some aspects, the transport system can select between a set of candidate vehicles within certain proximity of the requesting user's current location, where the set of candidate vehicles can include both human-driven vehicles and AVs. Examples described herein recognize that certain roads or road lanes may require less complexity in mapping and less risk for AV operation. Accordingly, AV operators may focus on mapping a limited road network within a given region for AV use. This mapped road network can comprise an "autonomy grid" in which AVs can utilized highly detailed and labeled localization maps which can identify static objects and location markers as well as traffic signals, right-of-way information, road signs, bicycle lanes, and the like. During operation, AVs may utilize these localization maps to determine a current location and orientation, as well as identify dynamic objects of interest in the AV's live sensor view, such as pedestrians and other vehicles.

According to examples described herein, the transport system can perform a vehicle matching operation given a received transport request from a requesting user. The matching operation can comprise identifying a set of candidate vehicles based on the user's current location—or a pick-up location indicated in the transport request—and ultimately selecting a most optimal vehicle to service the transport request. In doing so, the transport system can select a human driver that is within the closest distance or shortest ETA to the requesting user. If the requesting user is within a certain walking distance from the autonomy grid, the transport system may select an AV to service the transport request. In certain variations, the transport system can perform a cost optimization between the set of candidate vehicles to identify a lowest cost vehicle, human-driven or AV, to service the transport request. In such variations, the transport system can make the selection based on the pick-up location, an inputted drop-off location, and a projected cost to the requesting user for each of the set of candidate vehicles. Accordingly, the transport system can determine a cost savings and/or time savings for the requesting user for rendezvousing with an AV along the autonomy grid.

In further variations, the transport system can include a time optimization in the selection process that includes an estimated walking time (EWT) for the requesting user to rendezvous with an AV (e.g., an EWT from the user's current location to a specific point on the autonomy grid). Accordingly, the transport system can weigh between cost, vehicle ETA to rendezvous with the requesting user, and EWT for the requesting user to a pick-up location in ultimately selecting a human-driven vehicle or AV to service the transport request. When selecting an AV, the user may be immediately proximate to the autonomy grid or within a predetermined distance or time from the autonomy grid (e.g., one hundred meters or three minutes EWT). Furthermore, the transport system can determine an optimal pick-up location along the autonomy grid based on the current location of the requesting user and a current location of the selected AV. In further examples, the transport system may also account for the inputted drop-off location in selecting the optimal pick-up location. In one example, the transport system can identify the optimal pick-up location such that the EWT and the ETA of the selected AV are the nearly the same.

Once the optimal pick-up location is selected, the transport system can transmit, to a computing device of the requesting user, data indicating walking directions from the current location of the requesting user to the optimal pick-up location. The transport system can also monitor progress made by the requesting user and the AV to the optimal pick-up location. When the progress by the requesting user and the AV diverge by a certain amount, the transport system can coordinate the requesting user and AV in order to prevent a missed pick-up. In certain implementations, such coordination may be weighed in favor of the user waiting at the optimal pick-up location as opposed to the AV to prevent potential traffic issues caused by the waiting AV. Accordingly, if the user's progress towards the optimal pick-up location is unusually leisurely, the transport system can transmit modulation commands to the selected AV to slow down progress to the pick-up location (e.g., drive slower). Additionally or alternatively, the transport system can modify the pick-up location to reduce the walk time by the user. Additionally or alternatively still, the transport system can transmit notifications to the user's computing device indicating the potential for a missed ride. As a final recourse, the transport system can failover to another AV, ride service, or human-driven vehicle when a missed pick-up occurs.

While the AV and user are en route to the optimal pick-up location, the transport system can transmit data that causes the user's computing device to generate map content indicating turn-by-turn walking directions to the optimal pick-up location. The map content can also indicate the dynamic location and route of the selected AV, as well as the ETA of the AV and the EWT of the user. Additionally, the transport system can transmit a status update while the requesting user progresses towards the optimal pick-up location. The status update can indicate at least one of (i) a projected wait time for the requesting user when the requesting user arrives at the optimal pick-up location, (ii) an on-target status indicating an adequate convergence rate upon the optimal pick-up location by the requesting user and the selected AV, or (iii) an indication that the requesting user is projected to miss the selected AV at the optimal location.

In certain aspects, the selection process by the transport system in fulfilling a given transport request can include a multi-hop solution involving an AV and one or more human-driven vehicles. As described herein, a multi-hop solution can be coordinated based on a cost and/or time optimization for the requesting user (e.g., seeking to minimize both cost and overall time). Accordingly, an AV may be selected as one of multiple vehicles to service the transport request. Furthermore, in coordinating a multi-hop ride, the transport system can determine a rendezvous point along the autonomy grid at which the selected AV is to rendezvous with a human-driven vehicle to transport the requesting user from the rendezvous point to the desired drop-off location. Still further, the transport system can select a human-driven vehicle to rendezvous with the selected AV. For example, once the AV—with the requesting user as a passenger—is within a threshold distance or ETA to the rendezvous point, the transport system can determine a set of candidate vehicles within a given proximity to the rendezvous point, and select the human-driven from the candidate set (e.g., based on distance, time, or matching ETA with the AV). Once the human-driven vehicle is selected, the transport system can coordinate timing of the rendezvous between the selected AV and the human-driven vehicle by (i) determining respective ETAs for the human-driven vehicle and the selected AV to the rendezvous point, and (ii) transmitting live mapping data to a computing device of the driver indicating progress of the selected AV to the rendezvous point.

Among other benefits, the examples described herein achieve a technical effect of providing on-demand autonomous vehicle transportation services within a precisely mapped, low risk autonomy road network within a given region, such as a city center. Providing autonomous vehicle services through such mapped road networks can significantly increase road safety while decreasing traffic congestion.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, virtual reality (VR) or augmented reality (AR) computers, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

As provided herein, the term "autonomous vehicle" (AV) describes any vehicle operating in a state of autonomous control with respect to acceleration, steering, braking, auxiliary controls (e.g., lights and directional signaling), and the like. Different levels of autonomy may exist with respect to AVs. For example, some vehicles may enable autonomous control in limited scenarios, such as on highways. More advanced AVs, such as those described herein, can operate in a variety of traffic environments without any human assistance. Accordingly, an "AV control system" can process sensor data from the AV's sensor array, and modulate acceleration, steering, and braking inputs to safely drive the AV along a given route.

System Description

FIG. 1 is a block diagram illustrating an example on-demand transport facilitation system, according to examples described herein. The on-demand transport facilitation system 100 can communicate, over one or more networks 160, with requesting users or riders 174 throughout a given region where on-demand transportation services are provided. Specifically, each requesting user 174 can execute a rider application 175 on the user's 174 computing device 170. As provided herein, the rider's computing device 170 can comprise a mobile computing device, personal computer, tablet computing device, virtual reality (VR) or augmented reality (AR) headset, and the like. Execution of the rider application 175 can cause the rider device 170 to establish a connection over the one or more networks 160 with a rider interface 125 of the on-demand transport facilitation system 100.

In various aspects, the executing rider application 175 can cause a user interface 172 to be generated on a display screen of the rider device 170. Using the user interface 172, the requesting user 174 can generate and transmit a transport request 171 to the rider interface 125 of the transport system 100. In generating the transport request 171, the requesting user 174 can input a desired pick-up location, destination, and/or ride service. As provided herein, selectable ride services facilitated by the on-demand transport system 100 include carpooling, standard ride-sharing, high-capacity vehicle (e.g., a van), luxury vehicle, a professional driver, AV transport, or certain combinations of the foregoing.

According to examples, the on-demand transport facilitation system 100 can include a provider interface 115 that connects, via the one or more networks 160, with a fleet of transportation service provider vehicles 180 available to provide on-demand transportation services to the requesting users 174. In various examples, the service provider vehicles 180 can comprise a fleet of AVs 189, any number of drivers, and/or a blend of human-driven vehicles and AVs servicing a given region. In certain aspects, the human-driven vehicles 187 can also operate to provide transportation services at will, where the driver can execute a driver application 186 on a driver device 185 (e.g., a mobile computing device, smart phone, tablet computing device, etc.), causing the driver device 185 to transmit provider location data 113 indicating the driver's location to the provider interface 115. The executing driver application 186 can enable the driver of the vehicle 187 to receive transport invitations 138 indicating a pick-up location to rendezvous with a matched requesting user 174 to service a given transport request 171. Likewise, any given AV 189 in the fleet can transmit its current provider location 113 to the provider interface 115 of the on-demand transport facilitation system 100. The provider locations 113 can include the dynamic locations of each AV 189 and human-driven vehicle 187 (e.g., via GPS resources of the driver device 185) of the available service provider vehicles 180 throughout the given region. As provided herein, the provider interface 115 can transmit the provider locations 113 to a matching engine 130 of the transport system 100.

The matching engine 130 can receive the transport requests 171 from the rider interface 125, which can include respective pickup locations or current locations of the requesting users 174. Based on the provider locations 113, and using map data and/or traffic data, the matching engine 130 can identify a set of candidate vehicles 131 to service the transport request 171 (e.g., based on distance or time to a given pick-up location). In doing so, the selection engine 130 can identify vehicles proximate to the pickup location indicated in the transport request 171, and determine the set of candidate vehicles based on the vehicles being a predetermined distance or time from the pickup location.

In various implementations, the on-demand transport system 100 can include a database 140 that includes rider profiles 144. In matching the requesting user 174 with a particular driver or AV 189, the matching engine 130 perform a lookup of the rider profile 144 associated with the requesting user 174 and transport request 171 to determine any personal preferences, default selections (e.g., default ride choices), special requests, favored routes, ratings data for previous rides, or ride requirements. In some aspects, such data in the rider profile 144 can act as a filter for the matching engine 130 in ultimately selecting an optimal service provider from a given candidate set 131.

As provided herein, the matching engine 130 can utilize a cost optimizer 110 in determining a most optimal vehicle to service a given transport request 171. For example, once a transport request 171 is received, the matching engine 130 can initially utilize the current location 173 of the requesting user 174 to determine a candidate set of vehicles 131 within a certain distance or time from the user's location 173. In some aspects, the candidate set of vehicles 131 can include a blend of human-driven vehicles 187 and AVs 189 operating along the autonomy grid. The cost optimizer 110 can generate an estimated or upfront cost for each vehicle in the candidate set 131. The determined cost can be based on a distance and/or estimated time for the overall trip between the pick-up location and the desired destination. In various examples, the determined cost can further be based on a selected ride service type by the user 174 (e.g., carpool), or can be optimized across multiple services. For example, the cost optimizer 110 can determine that a multi-hop option—in which the rider 174 initially rendezvous with an AV 189 and then rendezvous a second time with a human-driven vehicle 187—would cost less than a full ride by a human-driven vehicle 187 to the destination.

The cost optimizer 131 can provide the cost data 114 indicating the estimated cost for each vehicle in the candidate set 131, and/or an estimated cost for a projected multi-hop ride, to the matching engine 130. Using the cost data 114, the matching engine 130 can make an ultimate ride selection for the requesting user 174, and transmit a confirmation 134 to the rider device 170 of the requesting user 174. The confirmation 134 can include identifying information of the driver and/or selected vehicle to service the transport request 171. In certain aspects, the confirmation 134 can further include an ETA of the selected vehicle to the pick-up location.

In various examples, the cost data 114 from the cost optimizer 110 can indicate that an AV 189 operating on the autonomy grid is most cost optimal, but would require a certain amount of walking or traveling by the requesting user 174. In such examples, the matching engine 130 can select the AV 189 automatically, or provide a notification prompt (e.g., as a content update 124) on the user interface 172 of the rider device 170 indicating the AV 189 as an option, which the requesting user 174 can confirm or decline.

According to examples described herein, the on-demand transport system 100 can include a rendezvous optimizer 150 that can aid the matching engine 130 in making a driver or AV selection, and determine optimal pick-up locations 154. In certain aspects, when the matching engine 130 selects an AV 189 to service a transport request 171, the matching engine 130 utilize the rendezvous optimizer 150 to determine a most optimal pick-up location 154 along the autonomy grid on which the AV 189 operates. For example, the rendezvous optimizer 150 can access an autonomy grid map 142 stored in the database 140 that indicates the autonomy grid on which the AVs 189 operate. The rendezvous optimizer 150 can further receive the dynamic location 113 a selected AV 189 from the matching engine 130 and the current location 173 of the matched user 174 in order to determine an optimal pick-up location 154 along the autonomy grid at which the selected AV 189 will rendezvous with the user 174. According to certain implementations, the autonomy grid map 142 can comprise a live map indicating the respective locations of the AVs 189, requesting users 174, and human-driven vehicles 187.

The rendezvous optimizer 150 can programmatically generate estimated times of arrival (ETAs) 153 for the selected AV 189 and estimated walking times (EWTs) 152 for the requesting user 174 integrated over a segment of the autonomy grid map 142 to determine the most optimal pick-up location 154. In doing so, the rendezvous optimizer 150 can identify a number of predetermined pick-up locations along the pick-up segment of the autonomy grid map 154, or can treat any point over the entire length of the pick-up segment as a possible pick-up location. Thus, the optimal pick-up location 154 may be any one of a limitless number of points along the pick-up segment. Furthermore, in determining the optimal pick-up location 154, the rendezvous optimizer 150 can seek to minimize wait time for the requesting user 174, or minimize overall time to pick-up by converging the ETA 153 of the selected AV 189 with the EWT 152 of the requesting user 174.

In various examples, the on-demand transport system 100 can include a coordination engine 120 to coordinate the pick-up once a match is made between a requesting user 174 and an AV 189. For example, the matching engine 130 can provide match data 133 indicating the selected AV 189 and the requesting user 174 to the coordination engine 120. In addition, the rendezvous optimizer 150 can provide the ETA 153 of the selected AV 189 and the EWT 152 of the requesting user 174 to the coordination engine 120. In various examples, the ETA 153 and EWT 152 can be dynamic in nature, changing as each of the selected AV 189 and the requesting user 174 progress to the pick-up location 154. Still further, the coordination engine 120 can receive the rider location 173 of the requesting user 174 and the AV location 188 of the selected AV 189 as they progress to the optimal pick-up location 154. The coordination engine 120 can then monitor the progress of each of the selected AV 189 and the requesting user 174 to the pick-up location 154.

In monitoring the progress of each of the requesting user 174 and the and the selected AV 189, the coordination engine 120 can determine whether either are moving too slowly or quickly in relation to their respective EWT 152 and ETA 153. If the requesting user 174 is pacing faster than the EWT 152, then the requesting user 174 may simply have to wait at the pick-up location 154 until the AV 189 arrives. However, if the requesting user 174 is pacing slower than the EWT 152, then the coordination engine 120 can execute one or more actions to ensure that a missed pick-up does not result. For example, the coordination engine 120 can identify that the ETA 153 and the EWT 152 are diverging, with the ETA 153 of the selected AV 189 getting progressively shorter than the EWT 152 of the requesting user 174.

According to examples, in response to determining that a missed pick-up is likely, the coordination engine 120 can generate modulation commands 121 that instruct the selected AV 189 to reduce or slow its progression towards the pick-up location 154. The coordination engine 120 may then transmit the modulation commands 121 to the selected AV 189 over the network(s) 160. The selected AV 189 can receive the modulation commands 121 and perform any number or combination of actions to slow its progression, such as reducing speed, pulling over at a safe location for a while, increasing stop times at stop signs or traffic lights, detouring, and the like. When the AV 189 is on-target with its ETA 153 as compared to the EWT 152 for the requesting user 174, the coordination engine 120 can transmit another modulation command 121 to normalize the AV's progress.

Additionally or alternatively, the coordination engine 120 can provide a content update 124 to the requesting user's computing device 170 that notifies the user 174 of the risk of a missed ride. Accordingly, the coordination engine 120 can motivate or induce the requesting user 174 to increase pace to the pick-up location 154 while transmitting modulation commands 121 to the selected AV 189 to reduce pace or otherwise slow its progression to the pick-up-location 154. In variations, the coordination engine 120 can update the optimal pick-up location 154 when certain conditions are met. For example, the coordination engine 120 can monitor a live traffic map indicating that the pick-up location 154 is blocked, or determine that the requesting user 174 has progressed quickly to the pick-up location 154 and can rendezvous with the AV 189 at a more optimal pick-up area that requires further walking. Accordingly, the coordination engine 120 can generate modulation commands 121 instructing the AV 189 to rendezvous with the user 174 at the updated pick-up location while providing a content update 124 to the user's computing device 170 indicating the updated pick-up location as well.

As described herein, the cost data 114 may indicate that a multi-hop ride is more cost optimal than other options for a given transport request 171. Additionally or alternatively, the matching engine 130 can determine that a multi-hop solution is more time optimal than other options. For example, the matching engine 130 can determine that the requesting user 174 would save significant time by doing an initial AV ride, and then rendezvousing with a human driver at a certain rendezvous point along the autonomy grid. As provided herein, a multi-hop ride comprises a trip from an initial pick-up location to a destination which involves multiple hops from one vehicle to the next. Specifically, in examples described herein, a multi-hop ride involves the use of an AV 189 that performs a rendezvous with one or more human-driven vehicles 187 over the course of a single trip for a requesting user 174. In certain examples, when a multi-hop trip is identified by the matching engine 130 as being more cost and/or time optimal than a single-hop trip, the matching engine 130 can provide a user prompt to the user interface 172 of the rider application 175 indicating the choice, which the user can accept or decline.

According to examples, when the requesting user 174 accepts the multi-hop option, the matching engine 130 can initially provide match data 133 indicating the match for the first ride segment to the coordination engine 120. For example, if the match data 133 indicates that the first segment involves an AV 189, the coordination engine 120 can provide modulation commands 121 and content updates 124 to coordinate the pick-up at the optimal pick-up location 154, as described above. The rendezvous optimizer 150 can determine an optimal rendezvous point along the autonomy grid map 142 at which the selected AV 189 can drop off the requesting user 174 so that a human-driven vehicle 187 transport the user 174 to the ultimate destination. In conjunction, the matching engine 130 can identify a new candidate set of drivers 131 based on the determined rendezvous point (which can be established as a new optimal pick-up location 154). As described, the matching engine 130 select a driver to rendezvous with the selected AV 189 based on distance or time to the rendezvous point, or based on cost data 114 as determined by the cost optimizer 110.

Upon selecting a driver, the matching engine 130 can transmit a transport invitation 138 to the driver's computing device 185 (e.g., over the network(s) 160 via the executing driver application 186) inviting the driver to rendezvous with the selected AV 189—having the requesting user on board—at the rendezvous point. The driver can accept the transport invitation 138, and data indicating the acceptance 191 can be transmitted back to the transport system 100. The coordination engine 120 can then utilize the current location 113 of the human driven vehicle 187 of the selected driver and the AV location 188 of the selected AV 189 to coordinate the rendezvous. In doing so, the coordination engine 120 can provide rendezvous instructions 126 to the driver of the selected vehicle 187 identifying the rendezvous point, and timing information for the selected AV 189 (e.g., an ETA 153 for the AV 189 to the rendezvous point).

In various examples, while the AV 189 transports the requesting user 174 along the autonomy grid and approaches the rendezvous point, the human-driven vehicle 187 can be en route or waiting to pick-up the requesting user 174 based on the rendezvous instructions 126. Thereafter, the driver of the human-driven vehicle 187 can transport the requesting user 174 for the remainder of the trip. Examples described herein also include the rendezvous optimizer 150 and coordination engine 120 determining optimal rendezvous points for a requesting user 174 to be picked up and dropped off by AVs 189 along the autonomy grid at specified locations where requesting users 174 may be met by drivers.

Autonomous Vehicle

Figure 2:
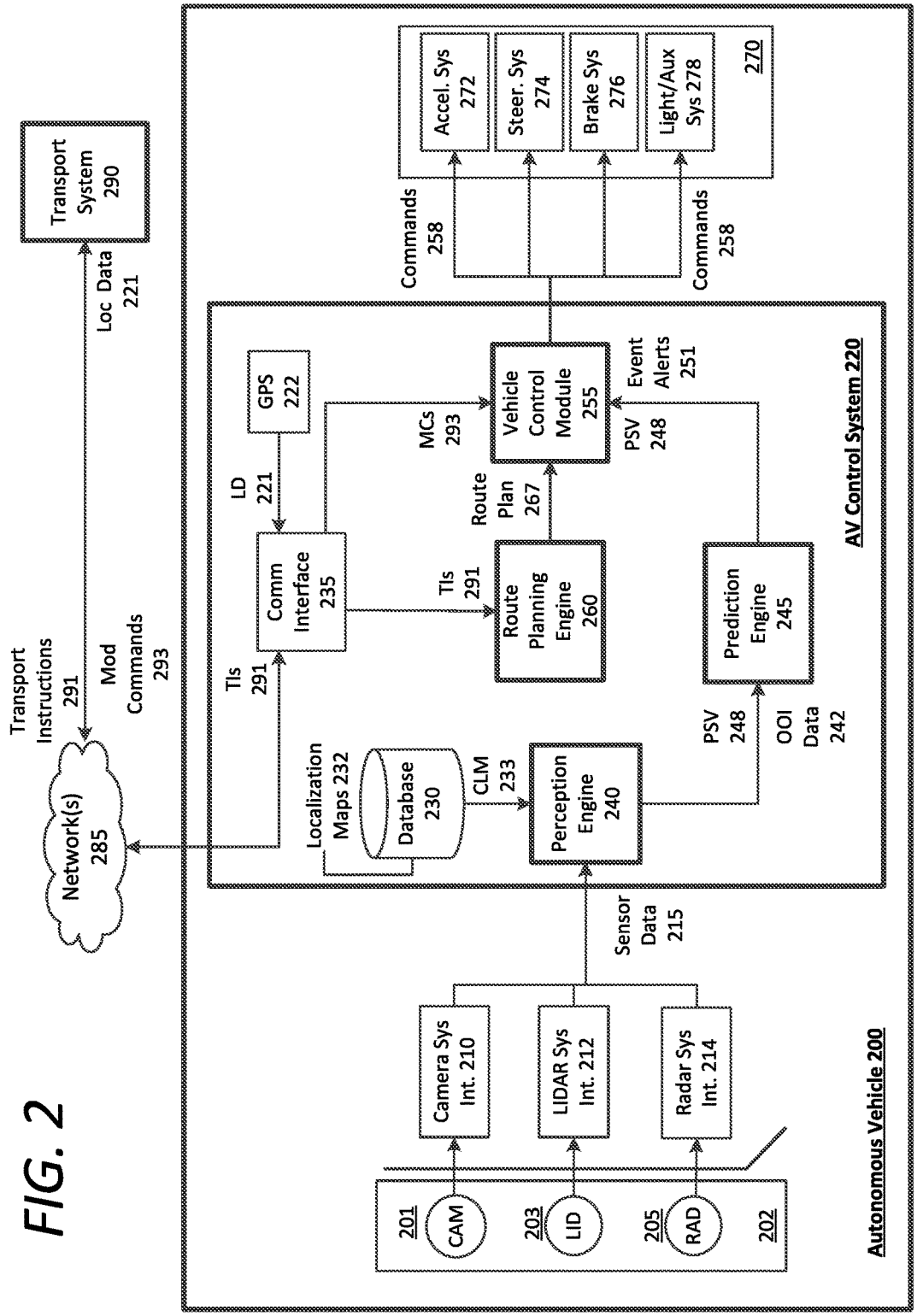
FIG. 2 is a block diagram illustrating an example autonomous vehicle in communication with an on-demand transport facilitation system, as described herein.

FIG. 2 is a block diagram illustrating an example autonomous vehicle in communication with an on-demand transport facilitation system, as described herein. In an example of FIG. 2, a control system 220 can autonomously operate the AV 200 in a given geographic region for a variety of purposes, including transport services (e.g., transport of humans, delivery services, etc.). In examples described, the AV 200 can operate without human control. For example, the AV 200 can autonomously steer, accelerate, shift, brake, and operate lighting components. Some variations also recognize that the AV 200 can switch between an autonomous mode, in which the AV control system 220 autonomously operates the AV 200, and a manual mode in which a driver takes over manual control of the acceleration system 272, steering system 274, braking system 276, and lighting and auxiliary systems 278 (e.g., directional signals and headlights).

According to some examples, the control system 220 can utilize specific sensor resources in order to autonomously operate the AV 200 in a variety of driving environments and conditions. For example, the control system 220 can operate the AV 200 by autonomously operating the steering, acceleration, and braking systems 272, 274, 276 of the AV 200 to a specified destination. The control system 220 can perform vehicle control actions (e.g., braking, steering, accelerating) and route planning using sensor information, as well as other inputs (e.g., transmissions from remote or local human operators, network communication from other vehicles, etc.).

In an example of FIG. 2, the control system 220 includes computational resources (e.g., processing cores and/or field programmable gate arrays (FPGAs)) which operate to process sensor data 215 received from a sensor system 202 of the AV 200 that provides a sensor view of a road segment upon which the AV 200 operates. The sensor data 215 can be used to determine actions which are to be performed by the AV 200 in order for the AV 200 to continue on a route to the destination, or in accordance with a set of transport instructions 291 received from an on-demand transport facilitation system 290, such as the on-demand transport facilitation system 100 described with respect to FIG. 1. In some variations, the control system 220 can include other functionality, such as wireless communication capabilities using a communication interface 235, to send and/or receive wireless communications over one or more networks 285 with one or more remote sources. In controlling the AV 200, the control system 220 can generate commands 258 to control the various control mechanisms 270 of the AV 200, including the vehicle's acceleration system 272, steering system 257, braking system 276, and auxiliary systems 278 (e.g., lights and directional signals).

The AV 200 can be equipped with multiple types of sensors 202 which can combine to provide a computerized perception, or sensor view, of the space and the physical environment surrounding the AV 200. Likewise, the control system 220 can operate within the AV 200 to receive sensor data 215 from the sensor suite 202 and to control the various control mechanisms 270 in order to autonomously operate the AV 200. For example, the control system 220 can analyze the sensor data 215 to generate low level commands 258 executable by the acceleration system 272, steering system 257, and braking system 276 of the AV 200. Execution of the commands 258 by the control mechanisms 270 can result in throttle inputs, braking inputs, and steering inputs that collectively cause the AV 200 to operate along sequential road segments according to a route plan 267.

In more detail, the sensor suite 202 operates to collectively obtain a live sensor view for the AV 200 (e.g., in a forward operational direction, or providing a 360 degree sensor view), and to further obtain situational information proximate to the AV 200, including any potential hazards or obstacles. By way of example, the sensors 202 can include multiple sets of camera systems 201 (video cameras, stereoscopic cameras or depth perception cameras, long range monocular cameras), LIDAR systems 203, one or more radar systems 205, and various other sensor resources such as sonar, proximity sensors, infrared sensors, and the like. According to examples provided herein, the sensors 202 can be arranged or grouped in a sensor system or array (e.g., in a sensor pod mounted to the roof of the AV 200) comprising any number of LIDAR, radar, monocular camera, stereoscopic camera, sonar, infrared, or other active or passive sensor systems.

Each of the sensors 202 can communicate with the control system 220 utilizing a corresponding sensor interface 210, 212, 214. Each of the sensor interfaces 210, 212, 214 can include, for example, hardware and/or other logical components which are coupled or otherwise provided with the respective sensor. For example, the sensors 202 can include a video camera and/or stereoscopic camera system 201 which continually generates image data of the physical environment of the AV 200. The camera system 201 can provide the image data for the control system 220 via a camera system interface 210. Likewise, the LIDAR system 203 can provide LIDAR data to the control system 220 via a LIDAR system interface 212. Furthermore, as provided herein, radar data from the radar system 205 of the AV 200 can be provided to the control system 220 via a radar system interface 214. In some examples, the sensor interfaces 210, 212, 214 can include dedicated processing resources, such as provided with field programmable gate arrays (FPGAs) which can, for example, receive and/or preprocess raw image data from the camera sensor.

In general, the sensor systems 202 collectively provide sensor data 215 to a perception engine 240 of the control system 220. The perception engine 240 can access a database 230 comprising stored localization maps 232 of the given region in which the AV 200 operates. The localization maps 232 can comprise a series of road segment sub-maps corresponding to the autonomy grid map 142 described with respect to FIG. 1. As provided herein, the localization maps 232 can comprise highly detailed ground truth data of each road segment of the given region. For example, the localization maps 232 can comprise prerecorded data (e.g., sensor data including image data, LIDAR data, and the like) by specialized mapping vehicles or other AVs with recording sensors and equipment, and can be processed to pinpoint various objects of interest (e.g., traffic signals, road signs, and other static objects). As the AV 200 travels along a given route, the perception engine 240 can access a current localization map 233 of a current road segment to compare the details of the current localization map 233 with the sensor data 215 in order to detect and classify any objects of interest, such as moving vehicles, pedestrians, bicyclists, and the like.

In various examples, the perception engine 240 can dynamically compare the live sensor data 215 from the AV's sensor systems 202 to the current localization map 233 as the AV 200 travels through a corresponding road segment. The perception engine 240 can flag or otherwise identify any objects of interest in the live sensor data 215 that can indicate a potential hazard. In accordance with many examples, the perception engine 240 can provide object of interest data 242 to a prediction engine 245 of the control system 220, wherein the objects of interest in the object of interest data 242 indicates each classified object that can comprise a potential hazard (e.g., a pedestrian, bicyclist, unknown objects, other vehicles, etc.).

Based on the classification of the objects in the object of interest data 242, the prediction engine 245 can predict a path of each object of interest and determine whether the AV control system 220 should respond or react accordingly. For example, the prediction engine 240 can dynamically calculate a collision probability for each object of interest, and generate event alerts 251 if the collision probability exceeds a certain threshold. As described herein, such event alerts 251 can be processed by the vehicle control module 255, along with a processed sensor view 248 indicating the classified objects within the live sensor view of the AV 200. The vehicle control module 255 can then generate control commands 258 executable by the various control mechanisms 270 of the AV 200, such as the AV's acceleration, steering, and braking systems 272, 274, 276.

On a higher level, the AV control system 220 can include a route planning engine 260 that provides the vehicle control module 255 with a route plan 267 to a given destination, such as a pick-up location, a drop off location, or other destination within the given region. In various aspects, the route planning engine 260 can generate the route plan 267 based on transport instructions 291 received from the on-demand transport system 290 over one or more networks 285. According to examples described herein, the AV 200 can include a location-based resource, such as a GPS module 222, that provides location data 221 (e.g., periodic location pings) to the on-demand transport system 290 over the network(s) 285. Based on the AV's 200 location data 221, the on-demand transport system 290 may select the AV 200 to service a particular transport request, as described above with respect to FIG. 1.

In various examples, the AV control system 220 can receive modulation commands 293 from the on-demand transport system 290. The modulation commands 293 can instruct the AV control system 220 to reduce or increase pace or progress to a given pick-up location indicated in the transport instructions 291. The modulation commands 293 can be processed by the vehicle control module 255 to modify the manner in which control commands 258 are generated. For example, the vehicle control module 255 can process the modulation commands 293 by increasing braking distances, reducing acceleration after a stopped state (e.g., decreasing throttle inputs), taking a detour, pulling the AV 200 over and waiting for a certain period of time, and the like. Thus, in order to avoid a missed pick-up, the vehicle control module 255 can receive and process modulation commands 293 received from the on-demand transport system 290, as described herein.

Rider Device

Figure 3:
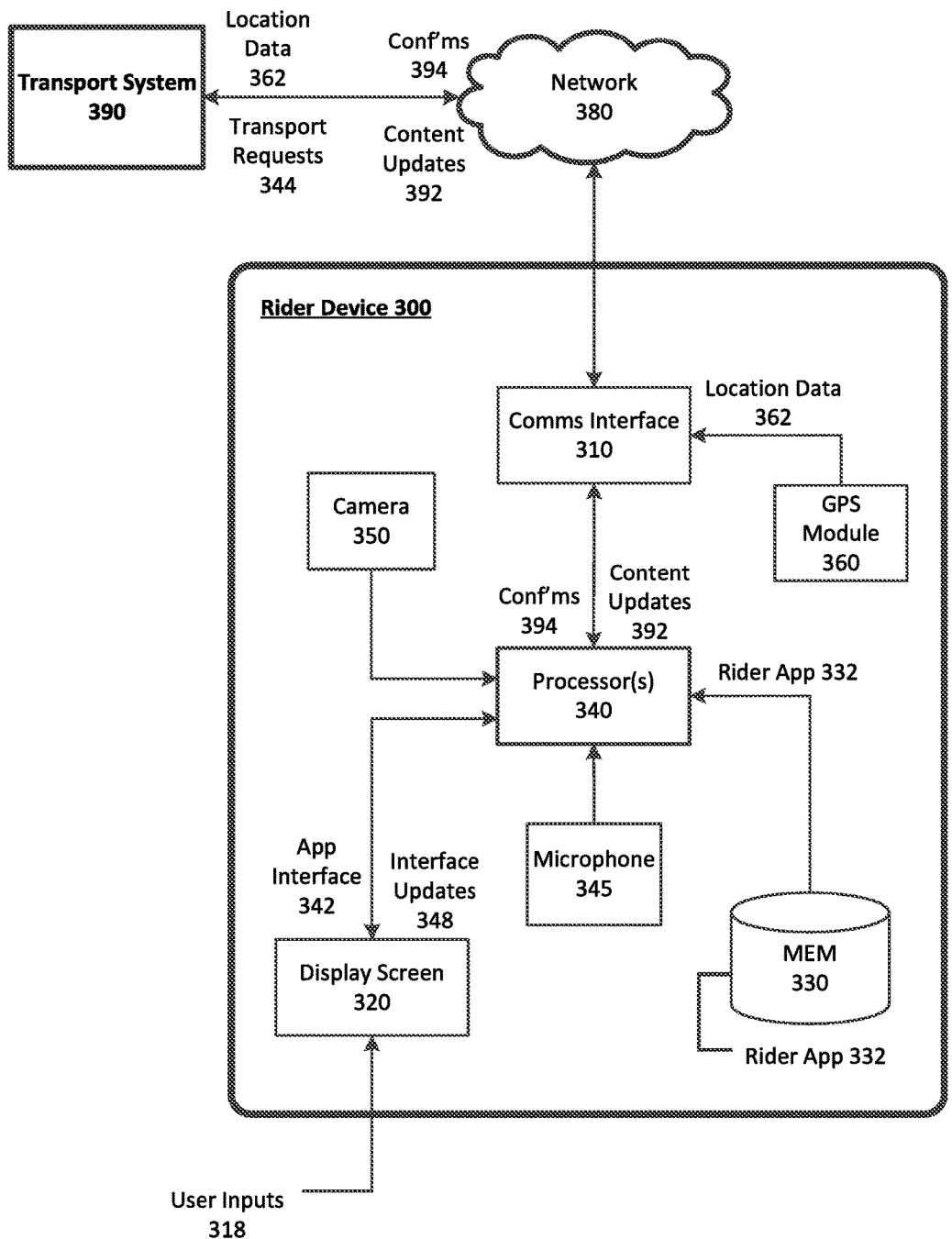
FIG. 3 is a block diagram illustrating an example rider device in connection with an on-demand transport facilitation system, as described herein.

FIG. 3 is a block diagram illustrating an example rider device in connection with an on-demand transport facilitation system, as described herein. In many implementations, the rider device 300 can comprise a mobile computing device, such as a smartphone, tablet computer, laptop computer, VR or AR headset device, and the like. As such, the rider device 300 can include typical telephony features such as a microphone 345, a camera 350, and a communication interface 310 to communicate with external entities using any type of wireless communication protocol. In certain aspects, the rider device 300 can store a designated application (e.g., a rider app 332) in a local memory 330.

In response to a user input 318, the rider app 332 can be executed by one or more processors 340, which can cause an app interface 342 to be generated on a display screen 320 of the rider device 300. The app interface 342 can enable the rider to configure and transmit a transport request 344 for on-demand transportation services to the transport system 390. The transport system 390 can process the transport request 344 by selecting an AV or human-driven vehicle to service the request, as described above with respect to FIG. 1. In various examples, the rider device 300 can also include a location-based resource, such as a GPS module 360 that transmits location data 362 to the transport system 390 over the network(s) 380.

The rider device 300 may then receive a confirmation 394 from the transport system 390 indicating a pick-up location along an autonomy grid at which an AV or driver will pick-up the rider. The confirmation 394 can cause the processor 340 to generate an interface update 348 on the display screen 320 that indicates identifying information of the AV or driver matched to pick up the rider. When an AV is selected to pick up the rider, the rider device 300 can receive content updates 392 from the transport system 390 that provide map content comprising walking directions to a pick-up location, an indicator of the AV's location and progress to the pick-up location, and any notifications of a potential missed pick-up or coaxing the rider to walk faster to the pick-up location.

Driver Device

Figure 4:
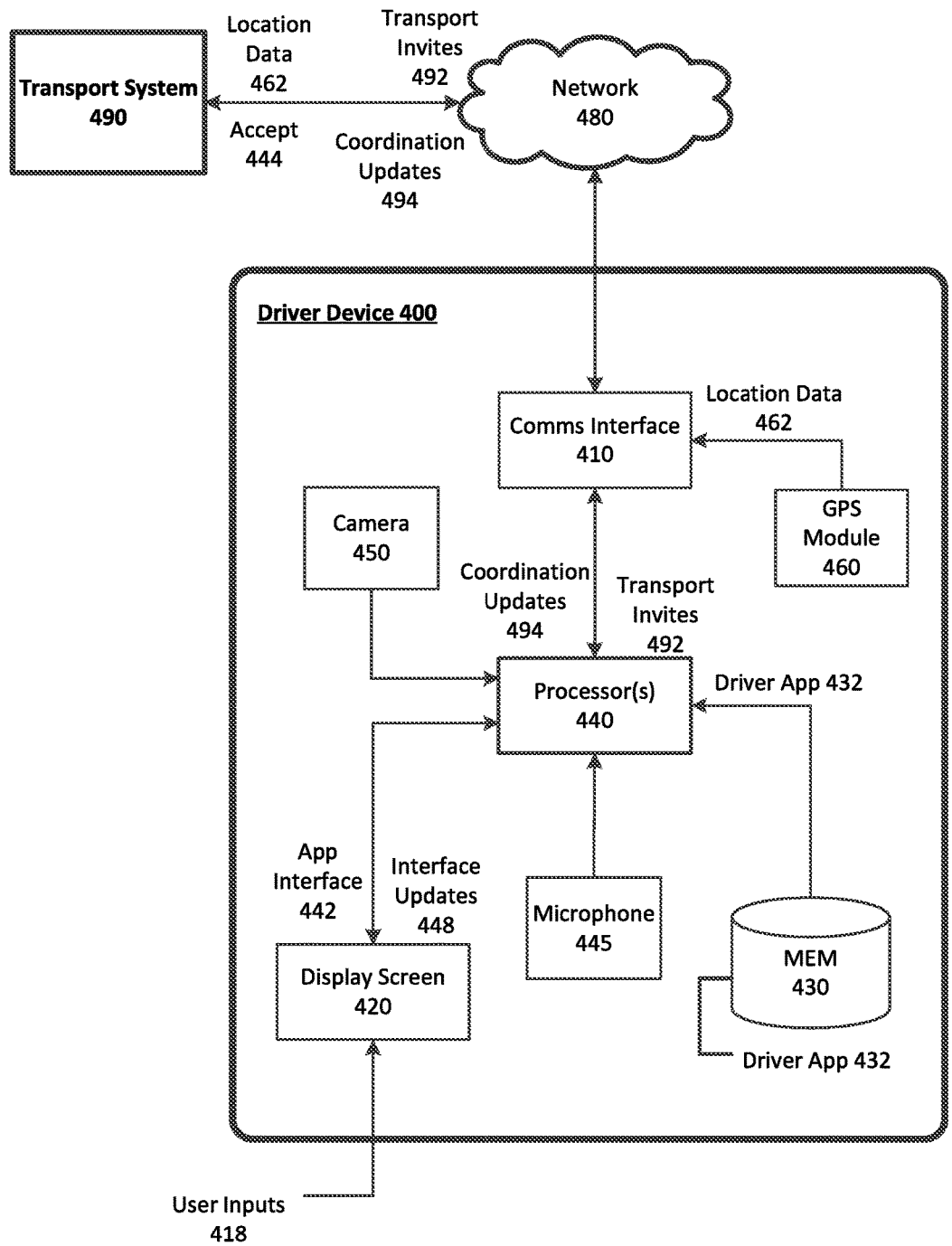
FIG. 4 is a block diagram illustrating an example driver device in connection with an on-demand transport facilitation system, as described herein.

FIG. 4 is a block diagram illustrating an example driver device in connection with an on-demand transport facilitation system, as described herein. In many implementations, the driver device 400 can comprise a mobile computing device, such as a smartphone, tablet computer, laptop computer, VR or AR headset device, and the like. As such, the driver device 400 can include typical telephony features such as a microphone 445, a camera 450, and a communication interface 410 to communicate with external entities using any type of wireless communication protocol. In certain aspects, the driver device 400 can store a designated application (e.g., a driver app 432) in a local memory 430.

In response to a user input 418, the driver app 432 can be executed by one or more processors 440, which can cause an app interface 442 to be generated on a display screen 420 of the driver device 400. The app interface 442 can enable the driver to initiate an "on-call" or "available" sub-state (of the normal application state), linking the driver device 400 to the on-demand transport system 490 that facilitates the on-demand transportation services. Execution of the driver application 432 can also cause a location resource (e.g., GPS module 460) to transmit location data 462 to the transport system 490 to indicate the current location of the driver with the given region.

In many aspects, the driver can receive transport invitations 492 from the transport system 490, where the transport invitations 492 indicate a particular pick-up location to service a pick-up request. The driver can provide acceptance confirmations 444 back to the transport system 490 indicating that the driver will service the pick-up request, or, in some aspects, decline the transport invitation 492 and await a subsequent opportunity. Upon submitting an acceptance confirmation 444, the driver application 432 can place the driver device 400 in an en route state while the driver drives to the pick-up location to rendezvous with the requesting user. Thereafter, the driver application 432 can initiate an on-trip sub-state (e.g., provide map directions to the requester's destination) while the driver transports the requesting user to the destination.

As provided herein, the driver device 400 can further receive coordination updates 494 including rendezvous instructions for rendezvousing with a requesting user and AV at a location along the autonomy grid. The coordination updates 494 can cause interface updates 448 on the display screen 420, providing dynamic data indicating timing information (e.g., ETA information for the AV) for the rendezvous point. In some aspects, the interface updates 448 can provide mapping content indicating turn-by-turn directions to the rendezvous point and, in certain examples, the dynamic location of the AV. Accordingly, the driver can view the convergence towards the rendezvous point between the driver's vehicle and the AV in real time.

Methodology

Figure 5A:
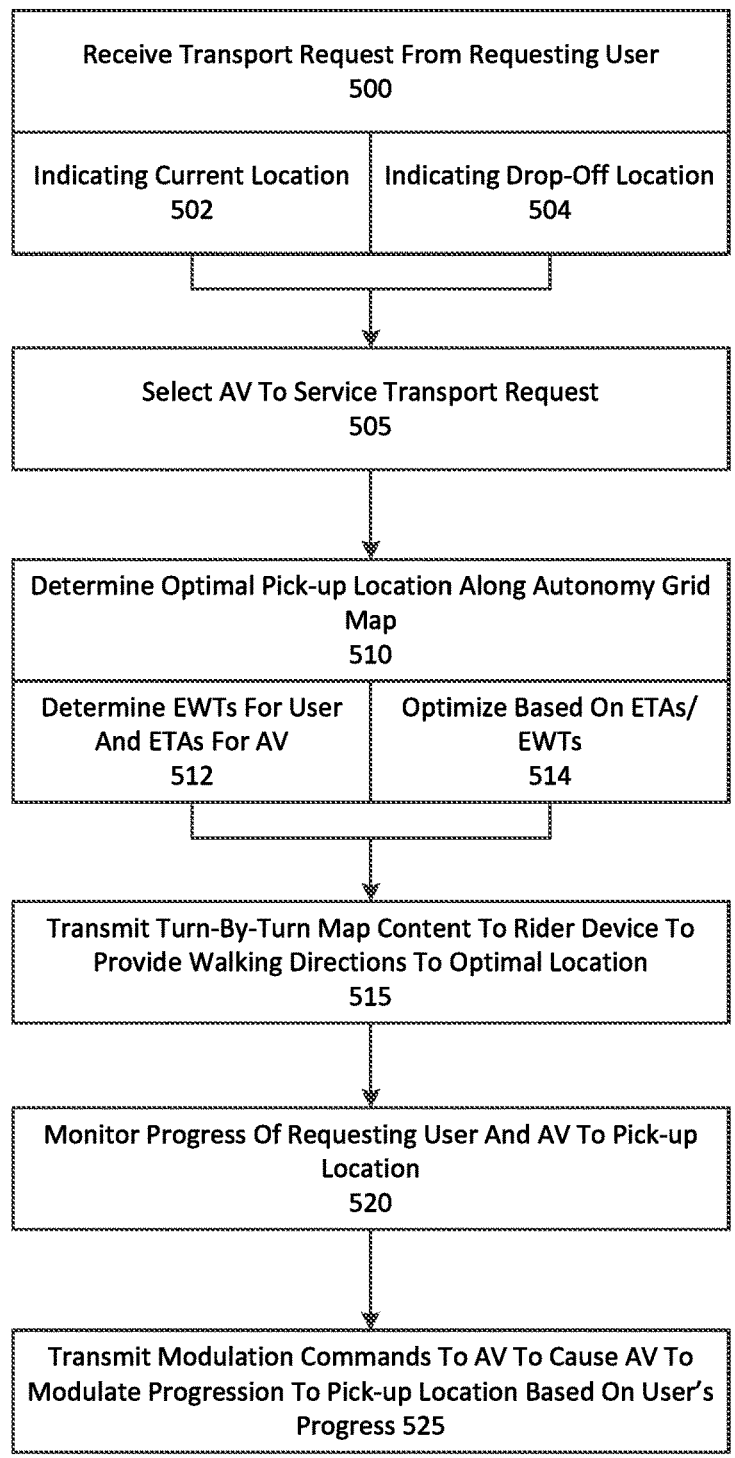
FIGS. 5A and 5B are flow charts describing example methods of facilitating on-demand transportation with autonomous vehicles, according to examples described herein.
Figure 5B:
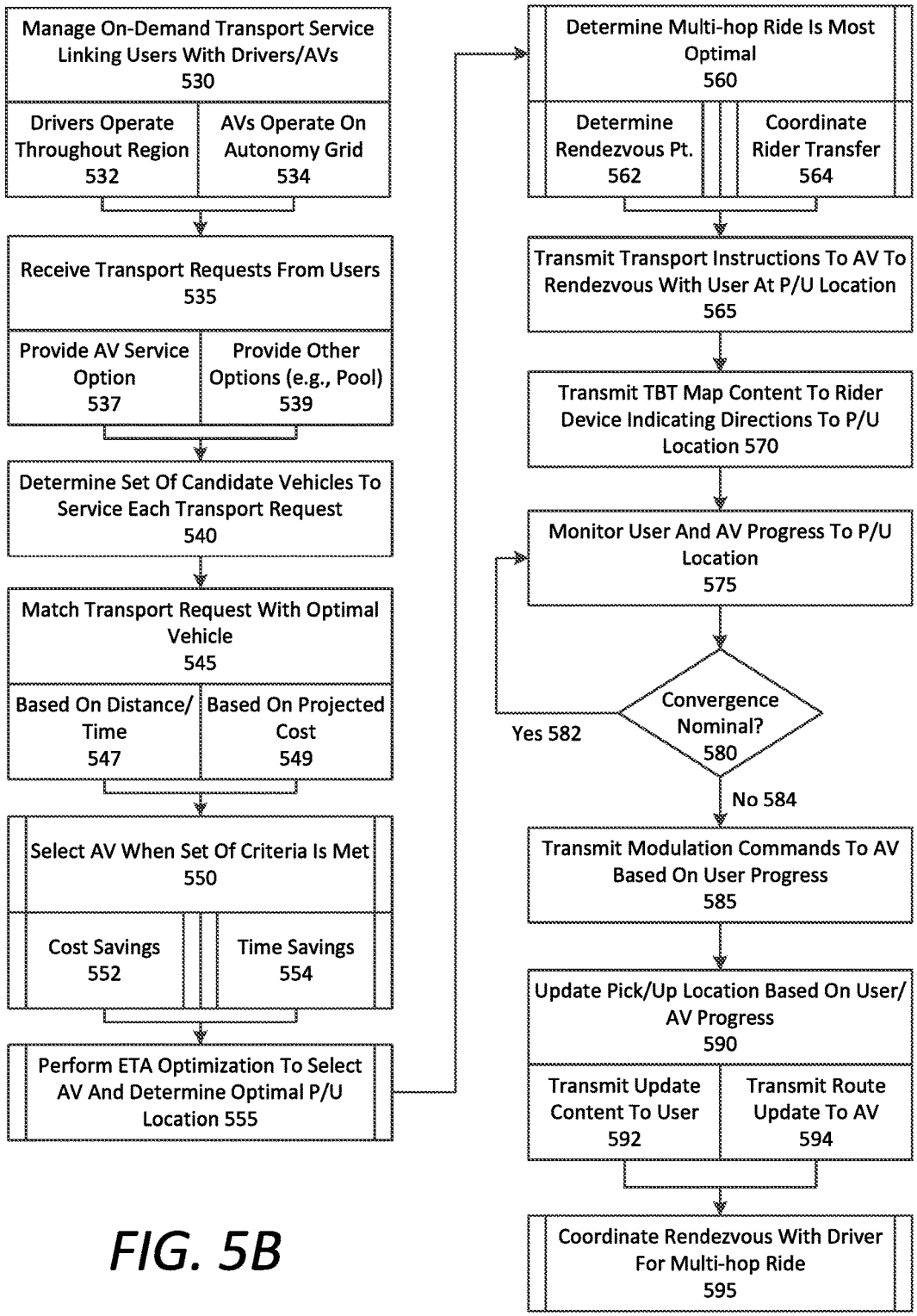

FIGS. 5A and 5B are flow charts describing example methods of facilitating on-demand transportation with autonomous vehicles, according to examples described herein. In the below descriptions of FIGS. 5A and 5B, reference may be made to reference characters representing like features as shown and described with respect to FIGS. 1 through 4. Furthermore, the below processes described with respect to FIGS. 5A and 5B can be performed by an example on-demand transport facilitation system 100, 290, 390, 490 as shown and described throughout the present disclosure. Referring to FIG. 5A, the on-demand transport system 100 can receive a transport request 171 from a requesting user 174 (500). In various examples, the transport request 171 can indicate the current location 173 of the requesting user 174 (502), and a drop-off location for the user 174 (504).

The transport system 100 may then select an AV 189 to service the transport request 171 (505). The transport system 100 may then determine an optimal pick-up location 154 along an autonomy grid map 142 based on the current location 173 of the requesting user 174 and the current location of the AV 189 (510). In doing so, the transport system 100 can determine estimated walking times (EWTs) 152 for the requesting user 174 and estimated times of arrival (ETAs) 153 across several possible pick-up locations along a relevant segment of the autonomy grid map 142 (512). In certain implementations, the transport system 100 can determine the optimal pick-up location 154 by performing an optimization based on the determined ETAs 153 for the selected AV 189 and the EWTs 152 for the requesting user 174 (514). The optimization can identify a location along the autonomy grid map 142 having minimal ETA 153 and EWT 152, or having a lowest EWT 152 for the requesting user 174.

According to examples, the transport system 100 can then transmit turn-by-turn map content to the rider device 170 of the requesting user 174 to provide walking directions to the optimal pick-up location 154 (515). The transport system 100 may then monitor progress of the requesting user 174 and the AV 189 to the optimal pick-up location 154 (520). And, in coordinating the pick-up, the transport system 100 can transmit modulation commands 121 to the selected AV 189 in order to cause the AV 189 to modulate progression to the optimal pick-up location 154 based on the user's progress (525). For example, if the user is pacing slowly to the pick-up location 154, the modulation commands 121 can cause the AV 189 to reduce its own pace as well.

FIG. 5B is a lower level flow chart describing an example method of facilitating on-demand transportation with autonomous vehicles, according to examples described herein. Referring to FIG. 5B, the transport system 100 can manage an on-demand transport service linking user 174 with available AVs 189 and drivers of vehicles 187 (530). As described herein, the driver can operate throughout an entire region (e.g., a metropolitan area) (532), whereas the AVs 189 can operate along an autonomy grid within the given region (534). The transport system 100 can receive transport requests 171 from requesting users 174 (535), providing an AV service option (537) as well as other service options (539) (e.g., carpooling, standard ridesharing, high capacity vehicle service, luxury vehicle service, etc.). Based on the current location 173 of the requesting user 174, the transport system 100 can then determine a set of candidate vehicles 131 to service each transport request 171 (540). The transport system 100 may then matching the transport request 171 with an optimal vehicle from the candidate set 131

(545). The transport vehicle 100 may do so based on distance and time or ETA from the pick-up location 154 (547), or based on a projected cost for the user 174 (549).

In various examples, the transport system 100 can select an AV 189 to service the transport request 171 when a set of criteria is met (550), such as cost savings (552) or time savings (554). For example, the transport system 100 may determine that costs savings and/or time saving will result if the requesting user 174 were to walk a certain distance to rendezvous with a selected AV 189 at a specified location along the autonomy grid. In some aspects, the transport system 100 can perform an ETA optimization to select the AV 189 and determine an optimal pick-up location 154 (555). The ETA optimization can comprise identifying an AV 189 that has an ETA 153 similar to the EWT 152 of the requesting user 174, determining ETAs 153 and EWTs 152 across a length of the autonomy grid, and selecting an optimal pick-up location 154 that minimizes walking distance for the requesting user 174, minimizes overall time to pick-up, minimizes wait time for the requesting user 174, and/or minimizes risk of a missed pick-up.

In certain circumstances, the transport system 100 can determine that a multi-hop ride is most optimal for the user 174 (560) (e.g., based on cost savings and/or time savings). In such examples, the transport system 100 can also determine a rendezvous point along the autonomy grid map 142 where the AV 189 will rendezvous with a human driven vehicle 187 to transfer the rider 174 (562) (e.g., a point closest to the rider's ultimate destination). Furthermore, the transport system 100 can coordinate the rider transfer between vehicles, as described herein (564).

According to examples, the transport system 100 can transmit transport instructions 132 to the selected AV 189 to rendezvous with the requesting user 174 at the optimal pick-up location 154 (565). The transport system 100 can also transmit turn-by-turn map content to the rider device 170 of the requesting user 174 indicating walking directions to the optimal pick-up location 154 (570). The transport system 100 may then monitor the respective progress of the requesting user 174 and AV 189 to the optimal pick-up location 154 (575). Based on the respective progress, the transport system 100 can dynamically determine whether the convergence of the requesting user 174—in walking or otherwise traveling to the pick-up location 154—and the AV 189—in navigating through traffic towards the pick-up location 154—is nominal (580). For example, the transport system 100 can determine whether the EWT 152 for the requesting user 174 and the ETA 153 of the AV 189 are substantially the same or similar, and whether they are decreasing at a same or similar rate based on the respective locations of the AV 189 and the requesting user 174.

If convergence is nominal (582), then the transport system 100 can continue to monitor user 174 and AV 189 progress to the pick-up location 154 (575). However, if the transport system 100 identifies a progression anomaly (e.g., the requesting user 174 being abnormally slow) indicating that the convergence exceeds a nominal threshold (584), then the transport system 100 can transmit modulation commands 121 to the selected AV 189 based on the user's progress (585). As provided herein, the nominal threshold can correspond to a difference between the EWT 152 and ETA 153 indicating a high probability of a missed ride. Accordingly, the modulation commands 121 can ultimately control the pace of the selected AV 189 to the pick-up location 154. For example, the modulation commands 121 can instruct the AV 189 to reduce its pace towards the pick-up location 154 based on the slow progress of the requesting user 174.

In certain examples, the transport system 100 can update the optimal pick-up location 154 based on the progress of the user 174 and/or the progress of the AV 189 (590). In doing so, the transport system 100 can transmit update content 124 to the rider device 170 of the requesting user 174 (592), and transmit a route update to the AV 189 that indicates the updated pick-up location. In addition, for multi-hop rides, the transport system 189 can then coordinate a rendezvous between the AV 189 and a driver of a vehicle 187 at a determined rendezvous point on the autonomy grid map 142 (595) (e.g., a point nearest the ultimate destination).

Hardware Diagrams

Figure 6:
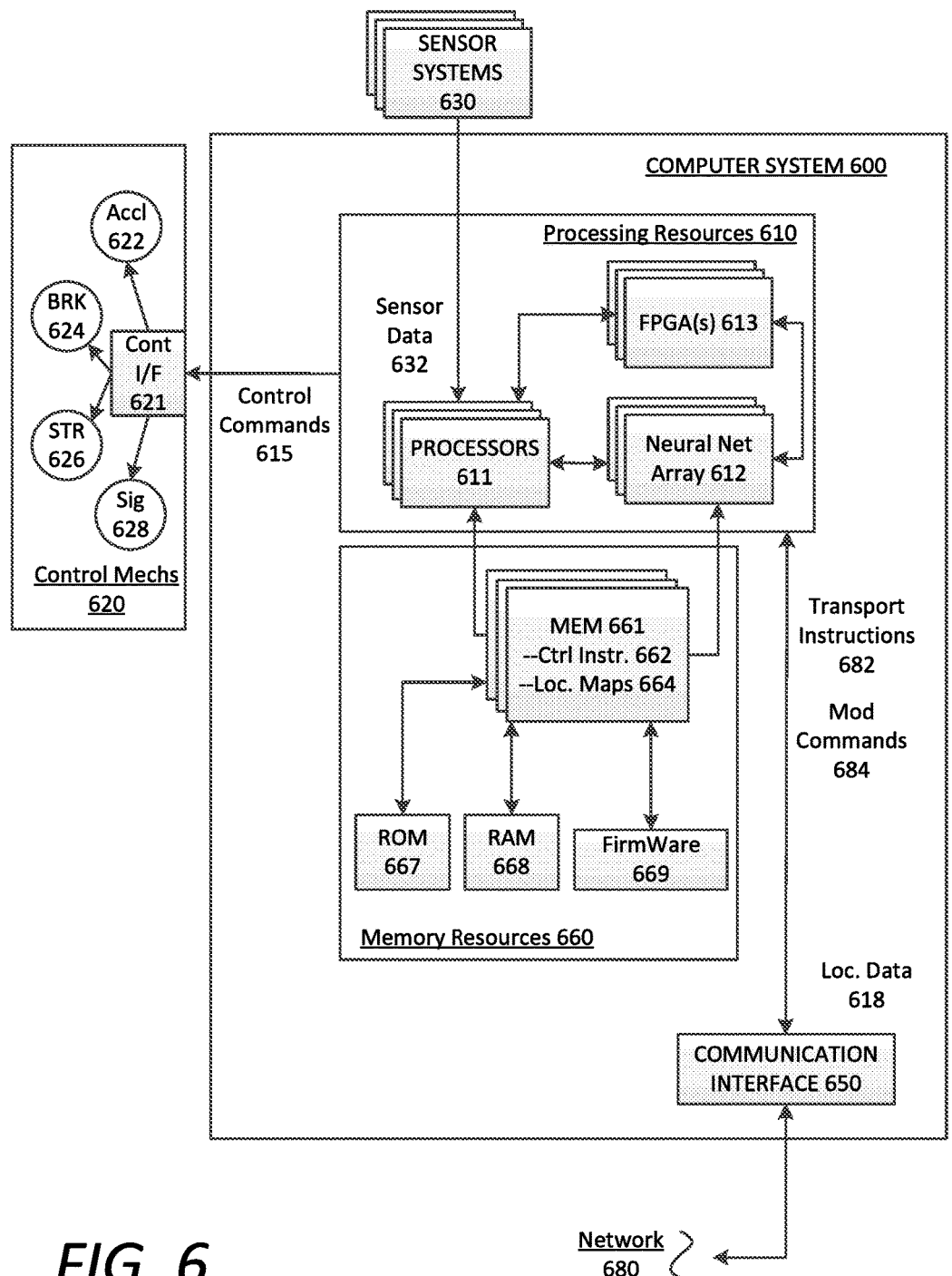
FIG. 6 is a block diagram illustrating a computer system for an autonomous vehicle upon which examples described herein may be implemented.

FIG. 6 is a block diagram illustrating a computer system upon which example AV processing systems described herein may be implemented. The computer system 600 can be implemented using a number of processing resources 610, which can comprise processors 611, field programmable gate arrays (FPGAs) 613. In some aspects, any number of processors 611 and/or FPGAs 613 of the computer system 600 can be utilized as components of a neural network array 612 implementing a machine learning model and utilizing road network maps stored in memory 661 of the computer system 600. In the context of FIG. 2, various aspects and components of the AV control system 220 can be implemented using one or more components of the computer system 600 shown in FIG. 6.

According to some examples, the computer system 600 may be implemented within an autonomous vehicle (AV) with software and hardware resources such as described with examples of FIG. 2. In an example shown, the computer system 600 can be distributed spatially into various regions of the AV, with various aspects integrated with other components of the AV itself. For example, the processing resources 610 and/or memory resources 660 can be provided in a cargo space of the AV. The various processing resources 610 of the computer system 600 can also execute control instructions 662 using microprocessors 611, FPGAs 613, a neural network array 612, or any combination of the foregoing.

In an example of FIG. 6, the computer system 600 can include a communication interface 650 that can enable communications over a network 680. In one implementation, the communication interface 650 can also provide a data bus or other local links to electro-mechanical interfaces of the vehicle, such as wireless or wired links to and from control mechanisms 620 (e.g., via a control interface 621), sensor systems 630, and can further provide a network link to a backend transport management system or a remote teleassistance system (implemented on one or more datacenters) over one or more networks 680.

The memory resources 660 can include, for example, main memory 661, a read-only memory (ROM) 667, storage device, and cache resources. The main memory 661 of memory resources 660 can include random access memory (RAM) 668 or other dynamic storage device, for storing information and instructions which are executable by the processing resources 610 of the computer system 600. The processing resources 610 can execute instructions for processing information stored with the main memory 661 of the memory resources 660. The main memory 661 can also store temporary variables or other intermediate information which can be used during execution of instructions by the processing resources 610. The memory resources 660 can also include ROM 667 or other static storage device for storing static information and instructions for the processing resources 610. The memory resources 660 can also include other forms of memory devices and components, such as a magnetic disk or optical disk, for purpose of storing information and instructions for use by the processing resources 610. The computer system 600 can further be implemented using any combination of volatile and/or non-volatile memory, such as flash memory, PROM, EPROM, EEPROM (e.g., storing firmware 669), DRAM, cache resources, hard disk drives, and/or solid state drives.

The memory 661 may also store localization maps 664 in which the processing resources 610—executing control instructions 662—continuously compare to sensor data 632 from the various sensor systems 630 of the AV. Execution of the control instructions 662 can cause the processing resources 610 to generate control commands 615 in order to autonomously operate the AV's acceleration 622, braking 624, steering 626, and signaling systems 628 (collectively, the control mechanisms 620). Thus, in executing the control instructions 662, the processing resources 610 can receive sensor data 632 from the sensor systems 630, dynamically compare the sensor data 632 to a current localization map 664, and generate control commands 615 for operative control over the acceleration, steering, and braking of the AV along a particular route plan based on transport instructions 682 received from an on-demand transportation facilitation system over the network 680. The processing resources 610 may then transmit the control commands 615 to one or more control interfaces 621 of the control mechanisms 620 to autonomously operate the AV along an autonomy route indicated in the transport instructions 682, as described throughout the present disclosure.

Furthermore, as described herein, the computer system 600 may receive transport instructions 682 from an external on-demand transport facilitation system, instructing the computer system 600 to rendezvous with a requesting user to make a pick-up, and transport the user to a drop-off location. The processing resources 610 can process the transport instructions 682 by generating a route plan and control instructions to execute the route plan to rendezvous with the requesting user. In various examples, the transport instructions 682 may be transmitted to the computer system 600 based on location data 618 of the computer system 600 indicating that the AV is most optimally situated to service a given transport request. The computer system 600 may further receive modulation commands 684 instructing the computer system to reduce or increase pace to a given pick-up location or rendezvous point, as described above.

Figure 7:
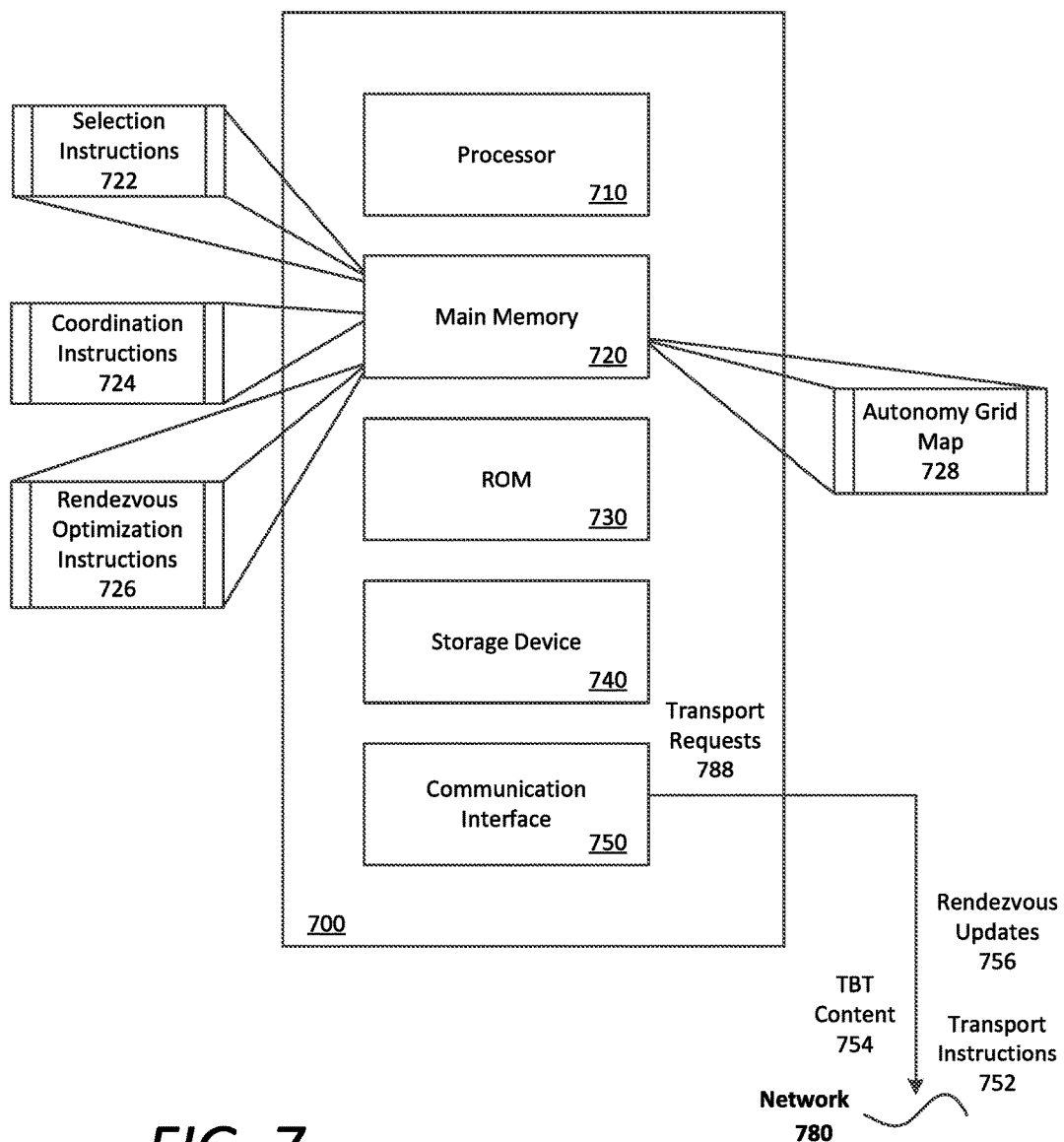
FIG. 7 is a block diagram illustrating a computer system for a backend datacenter upon which example on-demand transport systems described herein may be implemented.

FIG. 7 is a block diagram that illustrates a computer system upon which examples described herein may be implemented. A computer system 700 can be implemented on, for example, a server or combination of servers. For example, the computer system 700 may be implemented as part of a network service for providing transportation services. In the context of FIGS. 1 and 2, the on-demand transport facilitation system 100, 290, 390, 490 may be implemented using a computer system 700 such as described by FIG. 7.

In one implementation, the computer system 700 includes processing resources 710, a main memory 720, a read-only memory (ROM) 730, a storage device 740, and a communication interface 750. The computer system 700 includes at least one processor 710 for processing information stored in the main memory 720, such as provided by a random access memory (RAM) or other dynamic storage device, for storing information and instructions which are executable by the processor 710. The main memory 720 also may be used for storing temporary variables or other intermediate information during execution of instructions to be executed by the processor 710. The computer system 700 may also include the ROM 730 or other static storage device for storing static information and instructions for the processor 710. A storage device 740, such as a magnetic disk or optical disk, is provided for storing information and instructions.

The communication interface 750 enables the computer system 700 to communicate over one or more networks 780 (e.g., cellular network) through use of the network link (wireless or wired). Using the network link, the computer system 700 can communicate with one or more computing devices, one or more servers, and/or one or more autonomous vehicles. The executable instructions stored in the memory 720 can include selection instructions 722, which enable the computer system 700 to receive locations of AVs and human drivers operating throughout the given region, and select AVs and human drivers to service a transport request 788 received from requesting users. The executable instructions can further include rendezvous optimization instructions 726, which enable the computer system 700 to determine optimal pick-up and/or rendezvous locations for pick-ups and drop-off of requesting users. The instructions can further include coordination instructions 724, which enable the computer system 700 to coordinate multi-hop rides between AVs and human-driven vehicles The processor 710 is configured with software and/or other logic to perform one or more processes, steps and other functions described with implementations, such as described with respect to FIGS. 1-6, and elsewhere in the present application. Examples described herein are related to the use of the computer system 700 for implementing the techniques described herein. According to one example, those techniques are performed by the computer system 700 in response to the processor 710 executing one or more sequences of one or more instructions contained in the main memory 720. Such instructions may be read into the main memory 720 from another machine-readable medium, such as the storage device 740. Execution of the sequences of instructions contained in the main memory 720 causes the processor 710 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. An on-demand transport system comprising:
  one or more processors; and
  one or more memory resources storing instructions that, when executed by the one or more processors, cause the on-demand transport system to:

receive a transport request from a rider device of a requesting user;

based on a current location of the requesting user, select an autonomous vehicle (AV) to service the transport request, the selected AV operating on an autonomy grid within a given region;

determine an optimal pick-up location along the autonomy grid based on the current location of the requesting user and a current location of the selected AV;

transmit, to the rider device, data indicating walking directions from the current location of the requesting user to the optimal pick-up location;

monitor progress made by the requesting user to the optimal pick-up location; and transmit, to the selected AV, modulation commands instructing the selected AV to modulate progression to the optimal pick-up location based on the progress made by the requesting user to the optimal pick-up location.

2. The on-demand transport system of claim 1, wherein the executed instructions further cause the on-demand transport system to:

update the optimal pick-up location to a new pick-up location along the autonomy grid based on at least one of the progress made by the requesting user to the optimal pick-up location or progress made by the selected AV to the optimal pick-up location.

3. The on-demand transport system of claim 1, wherein the executed instructions cause the on-demand transport system to determine the optimal pick-up location by performing an optimization between the current location of the requesting user and the current location of the selected AV.

4. The on-demand transport system of claim 3, wherein the transport request indicates a drop-off location for the requesting user, and wherein the executed instructions cause the on-demand transport system to further perform the optimization based on the drop-off location.

5. The on-demand transport system of claim 1, wherein the executed instructions cause the on-demand transport system to select the AV by (i) identifying a set of candidate vehicles within a predetermined proximity of the current location of the requesting user, (ii) determining an estimated time of arrival (ETA) for each of the set of candidate vehicles to the current location of the requesting user, and (iii) determining at least one of a time savings or a cost savings for the requesting user by rendezvousing with the selected AV at the optimal pick-up location as compared with the ETAs of the set of candidate vehicles.

6. The on-demand transport system of claim 1, wherein the data indicating the walking directions further indicates the current location of the selected AV in real time.

7. The on-demand transport system of claim 1, wherein the on-demand transport system connects with the rider device of the requesting user via a designated rider application executing on the rider device.

8. The on-demand transport system of claim 7, wherein the transport request comprises a carpool request selected by the requesting user on the designated rider application.

9. The on-demand transport system of claim 7, wherein the transport request comprises an AV request selected by the requesting user on the designated rider application.

10. The on-demand transport system of claim 1, wherein the executed instructions further cause the on-demand transport system to:

transmit a notification to the rider device providing a status update while the requesting user progresses towards the optimal pick-up location, the status update indicating one of (i) a projected wait time for the requesting user when the requesting user arrives at the optimal pick-up location, (ii) an on-target status indicating an adequate convergence rate upon the optimal pick-up location by the requesting user and the selected AV, or (iii) an indication that the requesting user is projected to miss the selected AV at the optimal pick-up location.

11. The on-demand transport system of claim 1, wherein the executed instructions further cause the on-demand transport system to:

when the requesting user misses the selected AV, failover to an alternate AV operating on the autonomy grid; and transmit an update to the rider device of the requesting user indicating an ETA for the alternate AV.

12. The on-demand transport system of claim 1, wherein the executed instructions cause the on-demand transport system to select the AV as one of multiple vehicles to service the transport request to transport the requesting user to a desired drop-off location.

13. The on-demand transport system of claim 12, wherein the executed instructions further cause the on-demand transport system to:

determine a rendezvous point along the autonomy grid at which the selected AV is to rendezvous with a human-driven vehicle to transport the requesting user from the rendezvous point to the desired drop-off location.

14. The on-demand transport system of claim 13, wherein the executed instructions further cause the on-demand transport system to:

select the human-driven vehicle to rendezvous with the selected AV from a set of candidate vehicles within a given proximity to the rendezvous point;

transmit a transport invitation to a driver of the human-driven vehicle to pick-up the requesting user at the rendezvous point; and receive data indicating that the driver has accepted the transport invitation.

15. The on-demand transport system of claim 14, wherein the executed instructions further cause the on-demand transport system to:

coordinate timing of the rendezvous between the selected AV and the human-driven vehicle by (i) determining respective ETAs for the human-driven vehicle and the selected AV to the rendezvous point, and (ii) transmitting live mapping data to a driver device of the driver indicating progress of the selected AV to the rendezvous point.

16. A non-transitory computer readable medium storing instructions that, when executed by one or more processors, cause the one or more processors to:

receive a transport request from a rider device of a requesting user;

based on a current location of the requesting user, select an autonomous vehicle (AV) to service the transport request, the selected AV operating on an autonomy grid within a given region;

determine an optimal pick-up location along the autonomy grid based on the current location of the requesting user and a current location of the selected AV;

transmit, to the rider device, data indicating walking directions from the current location of the requesting user to the optimal pick-up location;

monitor progress made by the requesting user to the optimal pick-up location; and transmit, to the selected AV, modulation commands instructing the selected AV to modulate progression to the optimal pick-up location based on the progress made by the requesting user to the optimal pick-up location.

17. The non-transitory computer readable medium of claim 16, wherein the executed instructions further cause the one or more processors to:

update the optimal pick-up location to a new pick-up location along the autonomy grid based on at least one of the progress made by the requesting user to the optimal pick-up location or progress made by the selected AV to the optimal pick-up location.

18. The non-transitory computer readable medium of claim 16, wherein the executed instructions further cause the one or more processors to determine the optimal pick-up location by performing an optimization between the current location of the requesting user and the current location of the selected AV.

19. A computer-implemented method of coordinating on-demand transportation, the method being performed by one or more processors and comprising:

receiving a transport request from a rider device of a requesting user;

based on a current location of the requesting user, selecting an autonomous vehicle (AV) to service the transport request, the selected AV operating on an autonomy grid within a given region;

determining an optimal pick-up location along the autonomy grid based on the current location of the requesting user and a current location of the selected AV;

transmitting, to the rider device, data indicating walking directions from the current location of the requesting user to the optimal pick-up location;

monitoring progress made by the requesting user to the optimal pick-up location; and transmitting, to the selected AV, modulation commands instructing the selected AV to modulate progression to the optimal pick-up location based on the progress made by the requesting user to the optimal pick-up location.

20. The method of claim 19, further comprising:

updating the optimal pick-up location to a new pick-up location along the autonomy grid based on at least one of the progress made by the requesting user to the optimal pick-up location or progress made by the selected AV to the optimal pick-up location.

* * * * *